United States Patent
Susnjara et al.

(10) Patent No.: US 6,830,416 B2
(45) Date of Patent: Dec. 14, 2004

(54) SYSTEM AND METHOD FOR SECURING WORKPIECES TO A WORKTABLE OF A CNC MACHINING SYSTEM UTILIZING A LOW LEVEL VACUUM SOURCE

(75) Inventors: Kenneth J. Susnjara, Birdseye, IN (US); Michael P. Hardesty, Dale, IN (US); David Hildenbrand, Jasper, IN (US)

(73) Assignee: Thermwood Corporation, Dale, IN (US)

(*) Notice: Subject to any disclaimer, the term of this patent is extended or adjusted under 35 U.S.C. 154(b) by 98 days.

(21) Appl. No.: 10/386,511

(22) Filed: Mar. 13, 2003

(65) Prior Publication Data

US 2004/0179916 A1 Sep. 16, 2004

(51) Int. Cl.[7] .............................. B23C 1/06; B23C 9/00; B23Q 3/08; B25B 11/00
(52) U.S. Cl. ....................... 409/132; 409/163; 409/197; 409/151; 409/188; 269/21; 144/278.3
(58) Field of Search ................................ 409/131–132, 409/163, 197, 205, 219, 225, 149, 151, 188, 195; 144/278.3; 269/21

(56) References Cited

U.S. PATENT DOCUMENTS

| | | | | |
|---|---|---|---|---|
| 5,141,212 A | * | 8/1992 | Beeding | 269/21 |
| 5,375,951 A | * | 12/1994 | Veale | 409/131 |
| 5,493,767 A | * | 2/1996 | Susnjara | 409/132 |
| 5,743,685 A | * | 4/1998 | Piggott | 409/131 |
| 5,987,729 A | * | 11/1999 | Moran | 269/21 |

\* cited by examiner

*Primary Examiner*—Erica Cadugan
(74) *Attorney, Agent, or Firm*—Stevens, Davis, Miller & Mosher, LLP

(57) ABSTRACT

A system and method for operating a machine whereby a workpiece is held on a worktable of the machine with a suction force. When the work piece has a surface area insufficient to receive a full cut from a tool mounted in a tool head of the machine, the machine automatically adjusts the depth and the cutting speed of the tool to lesson the cut so the workpiece is not moved or ejected from the worktable. The depth and speed of the tool may be adjusted in a single cut pass of the tool or they may be adjusted in successive cut passes.

17 Claims, 4 Drawing Sheets

SECTION A-A

SYSTEM AND METHOD FOR SECURING WORKPIECES TO A WORKTABLE OF A CNC MACHINING SYSTEM UTILIZING A LOW LEVEL VACUUM SOURCE

BACKGROUND OF THE INVENTION

Computer numerical control (CNC) machine tools such as routers used in the woodworking, plastics and nonferrous metal industries, typically consist of a base unit, a stationary or movable workpiece support table mounted on a base unit, a stationery or movable gantry mounted on or adjacent the base unit, and a toolhead assembly mounted on a transversely disposed bridge member of the gantry. Either the table or the gantry is displaceable relative to the base unit longitudinally or along an x-axis, the toolhead assembly is displaceable transversely or along a y-axis and the toolhead is displaceable vertically or along a z-axis. Each is displaced along their respective axes by feedscrews driven by servomotors. The motions of the various components of the machine are controlled by a controller that operates the various servomotors of the machine according to instructions of a program inputted into the controller.

Workpieces to be machined are positioned on the table in predetermined locations, and are held down by various means including clamps and vacuum systems. Vacuum systems may consist of conventional systems that provide high vacuum, suitable for large production runs, and universal systems that are more suitable for short production runs. A conventional vacuum system generally includes a vacuum port provided in the worktable, connected to a vacuum pump and a vacuum fixture positioned on the workpiece table about the vacuum port on which the workpiece is positioned. The fixture is provided with a peripheral rubber seal engaged by the workpiece seated thereon, which permits the evacuation of air between the fixture and the workpiece to hold the workpiece in place. A universal vacuum system also known as a high flow system, generally includes a table having a lower rigid plate, an arrangement of spacers attached thereto in a grid pattern, a perimeter wall, an upper spoilboard formed of a porous material such as particleboard supported on the spacers and perimeter wall, closing the spacer grid area to form a plenum, and vacuum pump operatively connected to the plenum. As a vacuum is applied to the plenum, air is drawn through the porous upper board material, producing a low-pressure zone at the surface, which functions to hold a workpiece positioned thereon.

Each of the above-described systems has certain disadvantages. In the case of the conventional system, a discrete NC program must be developed to facilitate the routing of the perimeter gasket groove for each individual workpiece to be mounted. Each fixture then becomes dedicated to the workpieces for which it was adapted to hold.

Multiple fixtures must be prepared to facilitate the fastening of a variety of different workpieces. Consequently, the maintenance and storage of a sizable quantity of these fixtures is often required, which in turn, consumes a considerable amount of time and resources.

The alternate, high-flow method was developed in an effort to reduce the cost of preparing, storing, and changing spoil boards. However, because this method requires air to flow at a very high volume, it necessitates the use of an expensive, high volume pump that consumes a considerable amount of electrical energy.

Because air is drawn through the entire surface of the worktable, even while the work function is being performed, most of the energy required to operate the high-flow system is wasted. In addition to expensive vacuum pumps, both systems described in the foregoing paragraphs require an extensive array of peripheral items such as pipes, hoses, and valves.

In certain operations, such as nested based panel processing, the high-flow system is the only workable alternative. The expense involved in such a system adds considerably to the cost of a CNC machine installation. In some cases, the cost of a high-flow system can amount to as much as 30 percent of the total cost of a machine installation. CNC machine ownership thus becomes cost-prohibitive for many small business owners, who would otherwise stand to derive considerable benefit from CNC machining technology.

SUMMARY OF THE INVENTION

An object of the present invention is to provide a cost-effective vacuum operated hold-down system. A second object of the present invention is to provide a vacuum hold-down system that is an integral component of a CNC machining system. A third object of the present invention is to provide a modified cutting technique that allows the processing of smaller panels utilizing the high-flow system. Further objects of the present invention will become apparent, based on the following detailed description.

These and other objects are overcome in a system that utilizes a relatively low-cost centrifugal type impeller, coupled to an a-c induction motor. It is relatively light in weight, which facilitates the mounting of the entire system directly to the underside of the moving table of a CNC machine. By building the system into the machine, it is possible to place the inlet of the blower directly under the worktable vacuum port, thus eliminating all external piping. Since there is no need for piping within system, static pressure losses between the vacuum source and the worktable plenum are virtually non-existent. The system is simple and inexpensive.

The aforementioned technique produces less vacuum than the high-vacuum and high-flow systems currently in use. This lower level of vacuum results in a reduced force per square inch of part surface holding the part to the worktable. In this case, the total force holding smaller parts may be insufficient to counteract normal cutting forces and the part may move during the cutting process. This deficiency is overcome by the use of a modified cutting technique, which is automatically initiated in areas where the workpiece falls below a predetermined size. The technique comprises a multi-stage cutting cycle, whereby a first cycle leaves material in the bottom of the cut path on parts that fall below a predetermined size. The material remaining at the bottom of the cut path secures the small part to the adjoining parts during the cutting process. The remaining material is cut away in a second pass. Because the thickness of the remaining material is in the order of 10 thousandths of an inch, the cutting force required to remove the material is extremely low and will not move the workpiece, despite the relative low hold-down force. If however, the size of the part falls below yet a lower predetermined value, the speed of the cutting cycle will likewise be reduced by an amount sufficient for preventing movement during the cut cycle.

BRIEF DESCRIPTION OF THE DRAWINGS

Other embodiments, features and advantages of the invention described herein will occur to those skilled in the art from the following description of a preferred embodiment and the accompanying drawings, in which.

DETAILED DESCRIPTION OF THE PREFERRED EMBODIMENT

Figure 1:
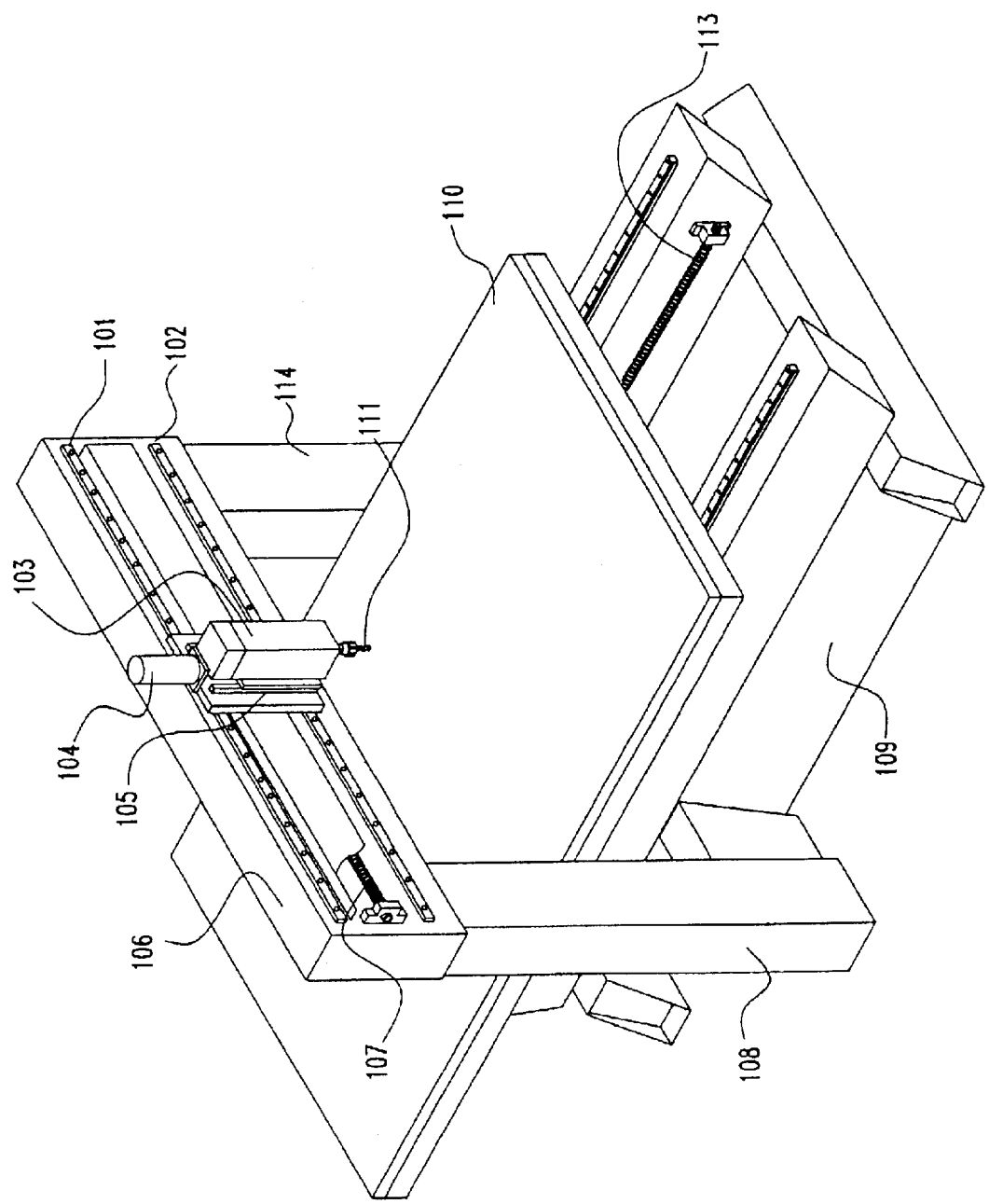
FIG. 1 is a drawing of a moving-table CNC machining center.

Referring to the drawing in FIG. 1, there is illustrated, an embodiment of a computer numeric controlled (CNC) machining system, which generally includes a base member 109, a worktable 110, a toolhead support assembly 105, and an electric spindle, 103, having a tool 111 mounted therein. The gantry, includes a pair of leg members 108 and 114 rigidly secured at their lower ends to the base member and a transversely disposed section 106 supported on the leg sections and spanning above the worktable. The base member is formed of steel sections welded together to provide a rigid and stable foundation. Worktable 110 is mounted horizontally with the surface parallel to the x-y plane and is adapted to be displaced longitudinally relative to the base member or along a y-axis. The front face of transverse section 106 is provided with a pair of vertically spaced, transversely disposed rails 101 and 102, on which toolhead support assembly 105 is mounted and displaceable transversely or along an x-axis. Electric spindle 103 is mounted on the bottom of the toolhead support assembly and is adapted to be displaced vertically by the same. Each of worktable 110, toolhead support assembly 105 and electric spindle 103 is displaceable along its respective axis by a feedscrew arrangement driven by an AC servomotor 104. The operation of such servomotors is controlled by a programmable computer-numeric controller (CNC) to provide for movement of a tool mounted on the toolhead along a motion path to perform a work function such as routing, shaping, drilling and the like on a workpiece mounted on the worktable. Instead of the worktable being displaceable and the gantry being stationary as described, the worktable can be stationary and the gantry may be displaceable along the Y-axis to provide displacement between the gantry and the worktable.

Figure 3:
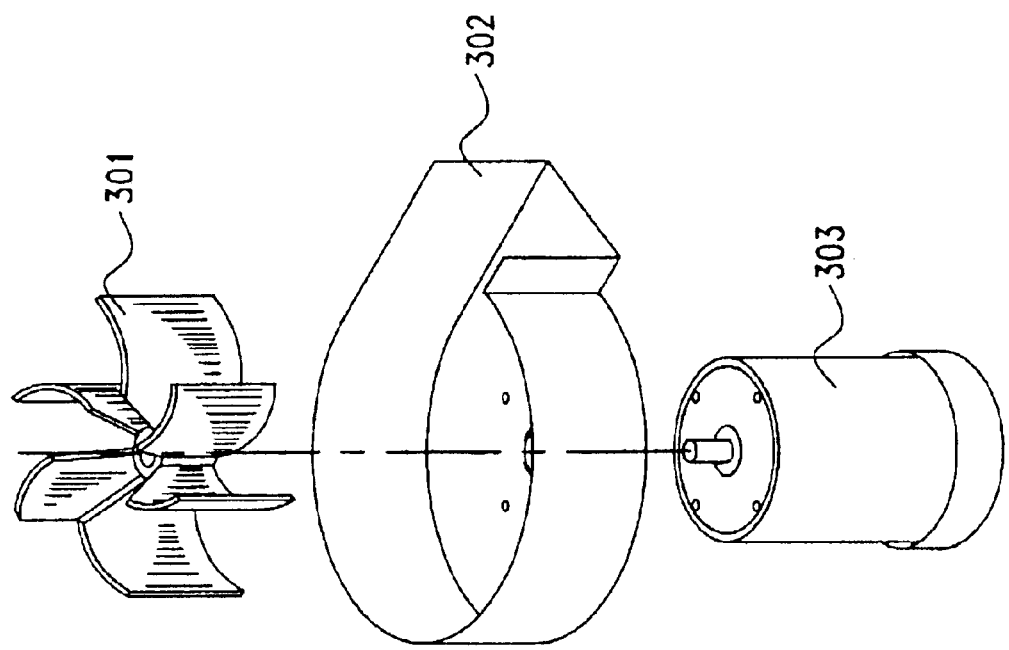
FIG. 3 is a drawing depicting an exploded view of a high-volume blower system.
Figure 2:
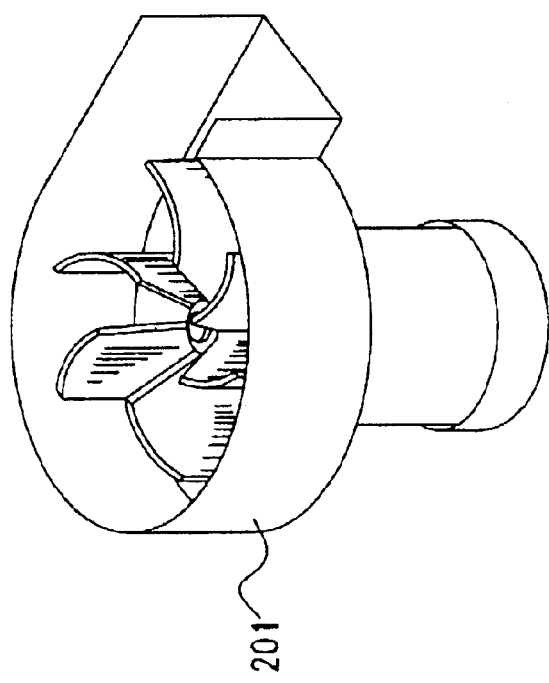
FIG. 2 is a drawing depicting a high-volume blower system.

FIG. 2 illustrates the embodiment of a vacuum blower assembly 201. FIG. 3 is an exploded view of the aforementioned assembly showing a drive motor 303 mounted to a housing 302 and operatively connected to a centrifugal blower impeller 301. Housing 303 serves as directed exhaust conduit and is shaped in such a manner as to provide for progressive expansion of the exhausted air, augmenting the vacuum produced by the rotating impeller.

Figure 4:
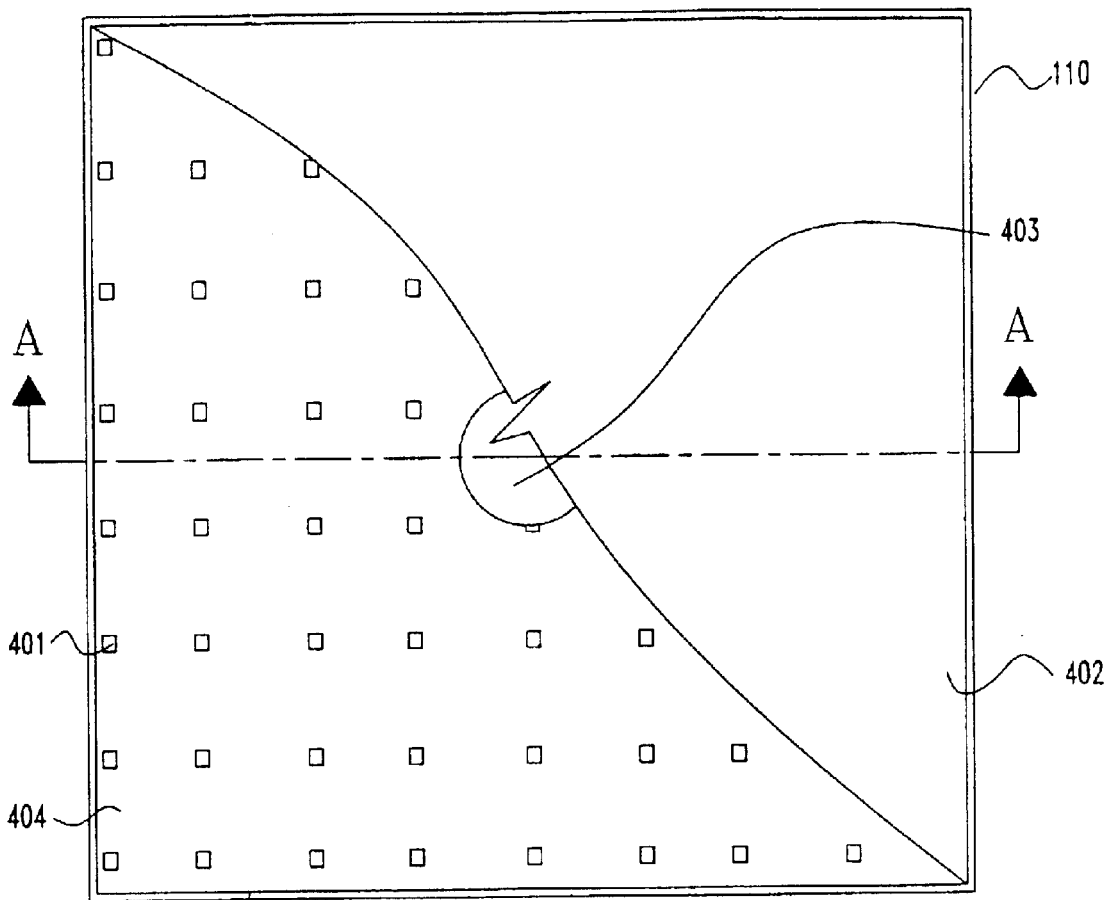
FIG. 4 is a top view of a moving-table CNC machining center depicting the various components of a vacuum type workpiece hold-down system.
Figure 4A:
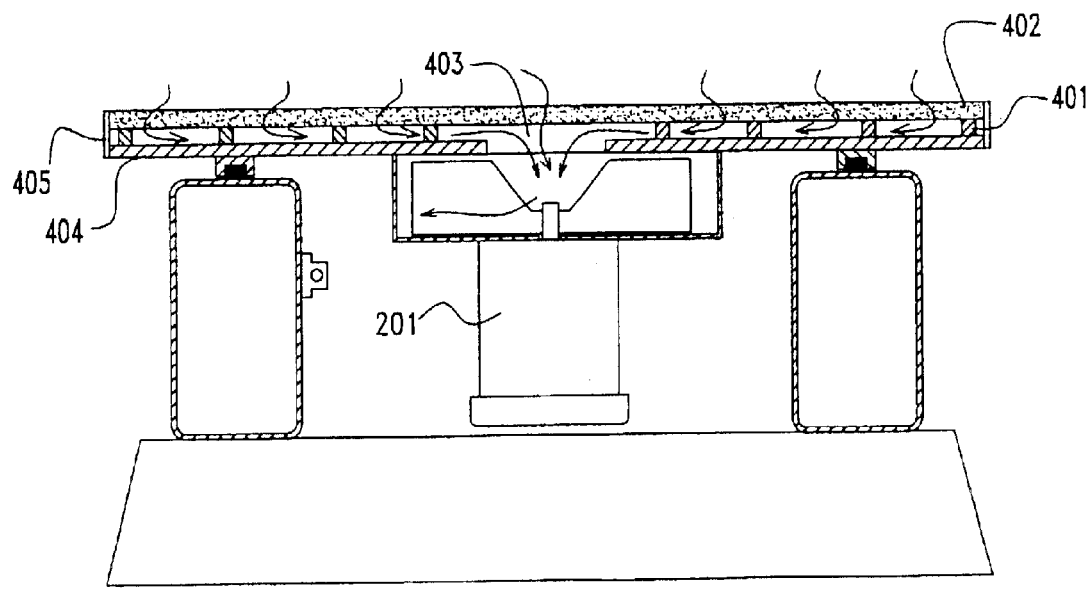
FIG. 4A is a cross-sectional view along line A—A of FIG. 4 depicting the various components of a vacuum type workpiece hold-down system.

Applicant now refers to FIGS. 4 and 4A. FIG. 4 is a top view of a CNC machining worktable, illustrated and identified as number 110 in FIG. 1. FIG. 4A is a cross-sectional view of the aforementioned worktable along line A—A. The worktable comprises principally, a rigid support plate 404 horizontally disposed parallel to the x-y plane, and provided with a plurality of spacer blocks 401 and an air inlet port 403. A porous worktable surface panel 402 is disposed above and parallel to support plate 404, and is supported by spacer blocks 401. A plurality of side-members 405 provides a perimeter around the periphery of the horizontally disposed members, forming a sealed plenum chamber.

Vacuum blower assembly 201 is mounted to the underside of support plate 404 with the center of the inlet of the blower displaced directly in the center of air inlet port 403. When blower 201 is activated, air is drawn through port 403 and a vacuum is formed in the plenum. Air is drawn through the porous upper board 402 producing a low-pressure zone at the surface, which functions to hold a workpiece when positioned thereon.

Because the available hold-down force varies in proportion to the surface area of the workpiece, it is conceivable that the hold-down force for relatively small workpieces may be less than adequate. Owing to this theory, the present invention provides a method for altering the workpiece processing program to compensate for any decreased hold-down force that might result from inadequate surface area. The surface area of the workpiece is calculated in the CNC control processor. If the surface area fails to fall within a specific parameter, the control will automatically decrement the z-axis motion, decreasing the cutting depth for the next cut-path. This will result in a very thin skin of material being left in the bottom of the cut-path. Even though the thickness of the remaining material is very thin, it is sufficient for holding the material together as a relatively large, coherent panel, thus preventing any unwanted movement due to cutting forces. The cutting program will then be repeated with the cutting tool penetrating through the remaining skin of material. Because the cutting resistance is many times less than that required to cut through the entire thickness of material, the small workpieces are not disturbed by the cutting force. If however, the size of the part falls below yet a lower predetermined value, the speed of the cutting cycle will be reduced by an amount sufficient for preventing movement during the cut cycle.

Figure 5:
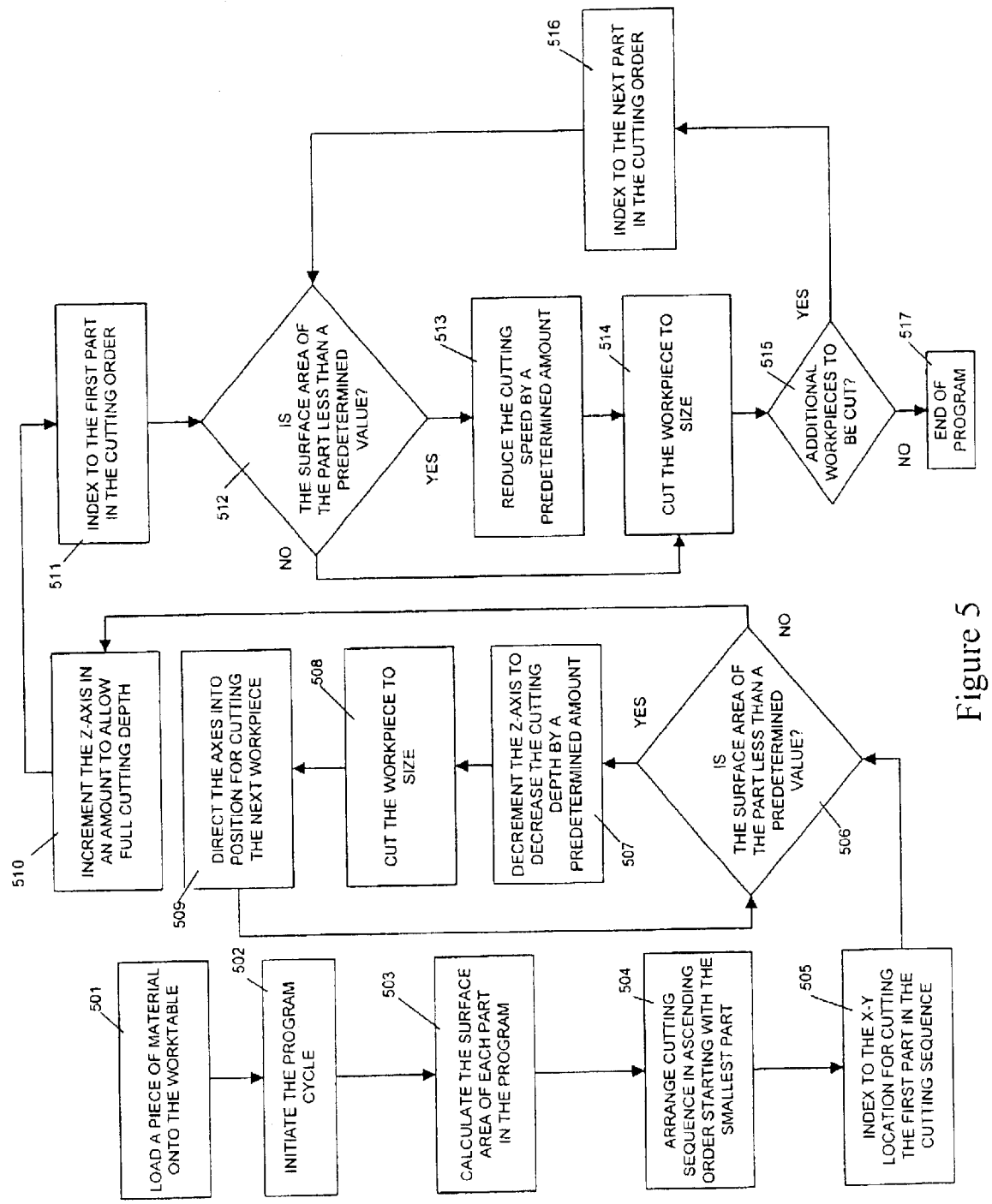
FIG. 5 is a flow chart depicting the process for cutting one or more workpieces from a material sheet.

Referring to the flow chart designated as FIG. 5, a workpiece is placed on the worktable of a CNC machine 501. The program cycle is then initiated 502. The surface area of each part to be cut is calculated 503. All of the workpieces are then arranged into an ascending cutting order beginning with the smallest piece 504. The axes are indexed into position for cutting the first part 505. The CNC control then checks the previously calculated surface area for the part 506. If the surface area of the part falls below a predetermined value, the z-axis will be decremented to a position that will not allow the cutting tool to penetrate completely through the material, thus leaving a thin skin on the bottom surface 507. The workpiece will be cut to size 508, and the machine is directed into position for cutting the next part 509. When all parts with a surface area that falls below a minimum value have been initially processed, the z-axis is incremented to allow full cutting depth 510. The axes are indexed back into position for processing the first part in the cutting order 511. If the workpiece is of sufficient size to ensure adequate hold-down force, the machine is directed to initiate the cutting cycle 514. If the workpiece is not of sufficient size to ensure adequate hold-down force, the cutting speed is reduced by an amount that will lessen the required cutting force for the part, thus preventing the part from moving during the cutting process 513. If no additional workpieces are required, the process is ended 517.

From the foregoing detailed description, it will be evident that there are a number of changes, adaptations and modifications of the present invention that come within the province of those persons having ordinary skill in the art to which the aforementioned invention pertains. However, it is intended that all such variations not departing from the spirit of the invention be considered as within the scope thereof as limited solely by the appended claims,

We claim:

1. A method of producing products on a machine, comprising the steps of:

placing at least one workpiece on a work surface of the machine;

providing a suction force across the work surface to hold each workpiece on the work surface;

activating a program to machine the at least one workpiece;

determining a surface area of each workpiece;

assigning a depth-of-cut parameter to each workpiece based upon its surface area; and machining each workpiece according to the program based on its respective assigned depth-of-cut parameter.

2. The method according to claim 1, wherein a computer connected to the machine determines the surface area of each workpiece.

3. The method according to claim 1, wherein a programmed depth for each workpiece is decremented in accordance with the depth-of-cut parameter to limit a depth the tool cuts into the workpiece.

4. The method according to claim 3, wherein the programmed depth is decremented when the surface area of the workpiece is less than a particular amount.

5. The method according to claim 4, wherein the machine cuts into the workpiece the un-decremented programmed depth when the surface area of the workpiece is greater than or equal to the particular amount.

6. The method according to claim 1, further comprising:

assigning a speed-of-cut parameter to each workpiece based on its respective surface area, wherein the step of machining according to the program further comprises machining each workpiece based on the assigned speed-of-cut parameter.

7. The method according to claim 6, wherein a programmed speed at which a tool cuts into the workpiece is reduced in accordance with the speed of cut parameter for the workpiece.

8. The method according to claim 7, wherein the programmed speed is reduced when the surface area of the workpiece is less than a particular amount.

9. The method according to claim 8, wherein the machine cuts into the workpiece at the un-reduced programmed speed when the surface area of the workpiece is greater than or equal to the particular amount.

10. The method according to claim 1, wherein the step of machining comprises machining each of the workpieces in ascending order, from the workpiece with the smallest surface area to the workpiece with the largest.

11. A method of producing products on a machine, comprising the steps of:

placing a plurality of workpieces on a work surface of the machine;

providing a suction force across the work surface to hold each workpiece on the work surface;

activating a program to machine the workpieces, the program having predetermined depth and speed parameters;

determining a surface area of each workpiece;

assigning a depth-of-cut and a speed-of-cut correction parameter to each workpiece based upon its surface area in contact with the work surface;

machining each workpiece according to the program based on the respective assigned depth-of-cut correction parameter and the speed parameter;

machining each workpiece a second time according to the program based on the depth parameter and the assigned speed-of-cut correction parameter.

12. The method according to claim 11, wherein a computer connected to the machine determines the surface area of each workpiece.

13. The method according to claim 11, wherein the depth parameter for each workpiece is decremented in accordance with the depth-of-cut correction parameter to limit a depth the tool cuts into the workpiece.

14. The method according to claim 13, wherein the depth parameter is decremented when the surface area of the workpiece is less than a particular amount.

15. The method according to claim 11, wherein the speed parameter for each workpiece is reduced in accordance with the speed-of-cut correction parameter for the workpiece.

16. The method according to claim 15, wherein the speed parameter is reduced when the surface area of the workpiece is less than a particular amount.

17. The method according to claim 11, wherein each step of machining comprises machining each of the workpieces in ascending order, from the workpiece with the smallest surface area to the workpiece with the largest.

* * * * *